3,093,628
MONOAZO DIPHENYL TRIAZINE DYESTUFFS
Jakob Benz, Munchenstein, Basel, August Schweizer, Muttenz, Basel, and Walter Wehrli, Riehen, Basel, Switzerland, assignors to Sandoz Ltd., Basel, Switzerland
No Drawing. Filed Aug. 18, 1959, Ser. No. 834,392
Claims priority, application Switzerland Aug. 20, 1958
6 Claims. (Cl. 260—153)

This invention relates to water-soluble monoazo dyestuffs of the general formula

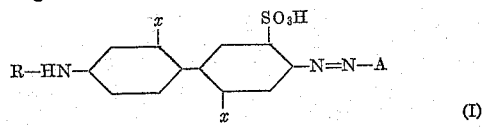

(I)

wherein the two $x$'s stand for a low molecular alkyl (methyl, ethyl) or alkoxy (methoxy, ethoxy) radical which may be further substituted, or a halogen atom, preferably chlorine or bromine, R for the radical of a symmetrical triazine compound, which radical contains at least one reactive halogen atom, preferably chlorine or bromine, which is combined to a carbon atom, and A for the radical of a coupling component.

The new monoazo dyestuffs are obtained by coupling 1 mole of the diazo compound of an amine of the general formula

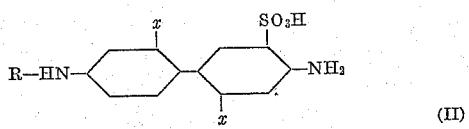

(II)

wherein the two $x$'s and R possess the aforestated meanings, with 1 mole of a coupling component and if desired, reacting the monoazo dyestuff formed, provided its radical R contains two further reactive halogen atoms, with ammonia or an amine.

A second mode of operation of the process consists in condensing 1 mole of a monoazo compound of the general formula

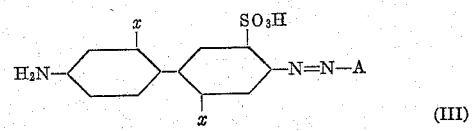

(III)

wherein the two $x$'s and A possess the aforecited meanings, with 1 mole of a symmetrical triazine compound which contains at least two reactive halogen atoms combined to carbon atoms, and, if desired, reacting the resulting monoazo dyestuff, when the condensed radical of the symmetrical triazine compound contains two further reactive halogen atoms, with ammonia or an amine.

Examples of symmetrical triazine compounds with at least two reactive halogen atoms combined to carbon atoms, such as are employed in the first mode of operation of the process for the production of the amines of general Formula II used as starting products and in the second mode of operation, are cyanuric chloride, cyanuric bromide, 2-methyl- or 2-phenyl-4.6-dichlorotriazine and primary condensation products of cyanuric chloride or cyanuric bromide with ammonia or amines.

Suitable amines which with cyanuric chloride or bromide yield the desired primary condensation products are, e.g., methylamine, dimethylamine, ethylamine, diethylamine, 2-hydroxyethylamine, di-(2-hydroxyethyl)-amine, n-propylamine, iso-propylamine, 2- or 3-hydroxypropylamine, 3-methoxypropylamine, 3- or 4-methoxybutylamine, 2-ethoxyethylamine, aminobenzene, N-methyl- or N-ethylaminobenzene, and amines with water-solubilizing groups such as 1-aminobenzene-3- or -4-sulfonic acid, 1-aminobenzene-2-, -3- or -4-carboxylic acid, 1-aminobenzene-3- or -4-sulfonic acid amides, 1-amino-3- or -4-methylsulfonylbenzenes, aminoacetic acid, and 2- or 3-aminopropionic acid.

The amines of general Formula II which are used in the first mode of operation of the process can be obtained, for example, by reacting diaminodiphenyl compounds of the general formula

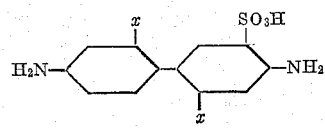

wherein $x$ has the aforementioned meaning, with a symmetrical triazine compound of the above-described type containing at least two mobile halogen atoms in a weakly acid aqueous medium at temperatures between 0° and 20° C. Examples of suitable diaminodiphenyl compounds of the cited type are 4.4'-diamino-2.2'-dimethyl-1.1'-diphenyl-5-sulfonic acid, 4.4'-diamino-2.2'-diethyl-1.1'-diphenyl-5-sulfonic acid, 4.4'-diamino-2.2'-dibromo-1.1'-diphenyl-5-sulfonic acid, 4.4'-diamino-2.2'-dichloro-1.1'-diphenyl-5-sulfonic acid and 4.4'-diamino-2.2'-dimethoxy-1.1'-diphenyl-5-sulfonic acid.

The amines of general Formula II which are used in the first mode of operation of the process are converted into their diazo compounds by one of the known methods of azo dyestuff chemistry, e.g., in aqueous solution or suspension by means of hydrochloric acid and sodium nitrite at temperatures between 0° and 15° C. Depending upon the type of coupling component used, the coupling reaction can be conducted in an aqueous acid, neutral or alkaline medium, the temperature being kept in the range of 0° to 20° C.

A large number of aliphatic and aromatic compounds capable of coupling are suitable for use as coupling components. Of special interest for the process of this invention are the 1-aryl-3-alkyl-5-pyrazolones and their water-soluble derivatives, hydroxynaphthalenesulfonic acids, aminonaphthalenesulfonic acids and aminohydroxynaphthalenesulfonic acids.

The aminoazo dyestuffs of general Formula III used in the second mode of operation of the process can be produced, for example, from the corresponding 2.2'-disubstituted 4.4'-diaminodiphenyl-5-sulfonic acid by monoacylation of the amino group in the 4' position, diazotization of the resulting 4'-acylamino-4-aminodiphenyl-5-sulfonic acid, coupling of the diazo compound formed with the coupling component to give the corresponding acylaminomonoazo dyestuff, and saponification of the acylamino group.

The reaction of these aminomonoazo dyestuffs with a symmetrical triazine compound of the above description containing at least two reactive halogen atoms is carried out preferably in a weakly acid to neutral aqueous medium at a pH value of 3 to 7. The reaction temperature is governed mainly by the reactivity of the triazine compound and varies from 0° to 80° C.

When the monoazo dyestuffs of general Formula I produced according to either of the two modes of operation of the process contain two further reactive halogen atoms, one of these atoms can be exchanged if desired for ammonia or an aliphatic cycloaliphatic or aromatic primary or secondary amine which may be further substituted. The exchange is best effected in a weakly acid to neutral aqueous medium at temperatures ranging from 20° to 70° C. The same amines which are used for the production of the primary condensation products from cyanuric chloride or bromide are suitable for the exchange.

The monoazo dyestuffs produced according to the disclosed process are new. They are suitable for dyeing, padding and printing fibers of animal or vegetable origin, e.g. wool, silk, and cotton, fibers of regenerated cellulose, animalized cellulosic fibers, synthetic polyamide fibers, mixtures of these fibers, and leather. Brilliancy of shade characterizes these dyestuffs. The dyeings obtained on cellulosic fibers are fast to light, washing, water and perspiration. The dyeings on wool, silk and synthetic polyamide fibers are fast to light, washing, water, milling, perspiration and dry cleaning.

Owing to the presence of at least one mobile halogen atom in the triazine radical the dyestuff molecule reacts with the fiber to form a stable linkage between the dyestuff and the fiber. The reaction of the mobile halogen atoms with the reactive hydrogen atoms of fibers containing amino groups already takes place in the acid pH region, while with fibers containing hydroxyl groups the presence of an alkali, e.g. sodium carbonate or bicarbonate, is of crucial importance for securing a uniform, smooth reaction. The dyestuffs possessing two mobile halogen atoms can be reacted with the fiber at room temperature or at a slightly higher temperature, e.g. 40° C., whilst those which posses only one mobile halogen atom are reacted at a higher temperature, e.g. 60° C. or above.

In the following examples the parts and percentages are by weight and the temperatures in degrees centigrade.

*Example 1*

22 parts of the primary condensation product of the general Formula II, obtained from 1 mole of cyanuric chloride and 1 mole of 4.4′-diamino-2.2′-dimethyl-1.1′-diphenyl-5-sulfonic acid, are suspended in 300 parts of ice-cold water and diazotized at 0–5° by the addition of 14 parts of 30% hydrochloric acid and a concentrated aqueous solution of 3.5 parts of sodium nitrite. The diazo compound formed is coupled at 0–5° with 12 parts of 2-amino-8-hydroxynaphthalene-6-sulfonic acid suspended in 100 parts of cold water. Crystallized sodium acetate is added to the reaction mixture in portions so that it reacts neutral to Congo Red indicator paper. When formation of the dyestuff is completed it is precipitated by the addition of sodium chloride and filtered off. The filter residue is thoroughly washed with aqueous sodium chloride solution and dried in vacuum at 40–50°. In the ground state the dyestuff is a brown powder which dissolves in water to give red solutions.

A typical dyeing method is as follows:
A dyebath is set with 5000 parts of water, 2 parts of the above-described dyestuff, 4 parts of glacial acetic acid and 2–3 parts of a commercial non-ionic levelling agent. 100 parts of a wool fabric are entered at 50°, the dyebath brought to the boil in 30 minutes and dyeing continued at the boil for 1 hour. The dyed fabric is removed, rinsed with water and dried. It is dyed in a red shade of very good fastness to light, washing, milling and perspiration.

*Example 2*

9.2 parts of cyanuric chloride are suspended in 100 parts of water and 100 parts of ice. 26.3 parts of the aminomonoazo dyestuff of general Formula III, obtained by coupling the diazo compound of 1 mole of 4′-acetylamino - 4 - amino - 2.2′ - dimethyl - 1.1′ - diphenyl - 5- sulfonic acid with 1 mole of 1-hydroxynaphthalene-4-sulfonic acid and subsequent splitting off of the acetyl group, are dissolved in 300 parts of water at 0° and this neutral solution is run into the suspension with vigorous stirring. A constant pH value of 3 to 4 is maintained by the addition of a 15% sodium carbonate solution to the reaction medium. The condensation product is precipitated with sodium chloride, filtered off and purified with sodium chloride solution. The dyestuff is dried with vacuum at 40–50°. It is ground to give a red-brown powder which dissolves in water with a scarlet coloration.

*Example 3*

9.2 parts of cyanuric chloride are suspended in 100 parts of water and 100 parts of ice. At 0° a neutral solution of 8.65 parts of 1-aminobenzene-3-sulfonic acid in 100 parts of water is run in with vigorous stirring. At the same time the pH value of the reaction mixture is maintained between 3 and 4 by regular additions of an aqueous sodium carbonate solution. On completion of the reaction, there is added a concentrated aqueous solution of 26 parts of the aminomonoazo dyestuff, produced by coupling the diazo compound of 1 mole of 4′-acetylamino - 4 - amino - 2.2′ - dimethyl - 1.1′ - diphenyl - 5- sulfonic acid with 1 mole of 1-(2′-chloro-6′-methylphenyl)-3-methyl-5-pyrazolone and saponifying the acetylamino group, the solution then being stirred at 40–50°. By the addition of further sodium carbonate solution a constant pH of 4 to 5 is maintained. The reaction completed, the condensation product is precipitated from the solution with sodium chloride, filtered off and dried "in vacuo" at 40–50°. On grinding the dyestuff is obtained as an orange-colored powder which dissolves in water to give yellow solutions.

A printing paste is prepared with:

40 parts of the dyestuff of this example,
100 parts of urea,
380 parts of water,
450 parts of 4% sodium alginate thickening,
10 parts of sodium 1-nitrobenzene-3-sulfonate and
20 parts of sodium carbonate 1000 parts total The cotton fabric is printed and dried and then exposed to dry heat (150°) for 5 minutes, rinsed in cold and warm water, soaped at the boil for 15 minutes, rinsed again in warm and cold water, and dried. A brilliant yellow print of excellent washing fastness is obtained.

In the following table further monoazo dyestuffs of the formula

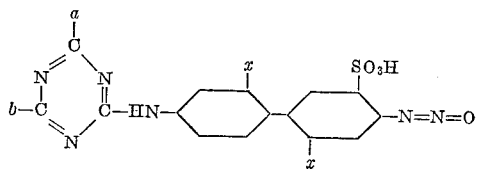

are enumerated. They are characterized by the definitions of the symbols $a$, $b$, $x$ and A, the material on which they are dyed and the shades they produce on the said material.

| Ex. No. | $a$ | $b$ | $x$ | A | Dyed on | Shade of the dyeing |
|---|---|---|---|---|---|---|
| 4 | Cl | Cl | Cl | 1-(2'-chloro-6'-methyl)-phenyl-3-methyl-5-pyrazolone. | Wool | Yellow. |
| 5 | Cl | —NH₂ | Cl | do | do | Do. |
| 6 | Cl | ⟨C₆H₄(SO₃H)⟩—NH— | Cl | do | do | Do. |
| 7 | Cl | Cl | —CH₃ | do | do | Do. |
| 8 | Cl | —NH₂ | —CH₃ | do | do | Do. |
| 9 | Cl | Cl | Cl | 2-amino-8-hydroxy-naphthalene-6-sulfonic acid (coupled in acid medium). | do | Red. |
| 10 | Cl | —NH₂ | Cl | do | do | Red. |
| 11 | Cl | —NH₂ | —CH₃ | do | do | Red. |
| 12 | Cl | Cl | —OCH₃ | 1-hydroxynaphthalene-3-sulfonic acid | do | Red-orange. |
| 13 | Cl | —NH₂ | —CH₃ | 1-hydroxynaphthalene-4-sulfonic acid | do | Red. |
| 14 | Cl | Cl | Cl | do | do | Red. |
| 15 | Cl | —NH₂ | Cl | do | do | Red. |
| 16 | Cl | ⟨C₆H₄(SO₃H)⟩—NH— | —CH₃ | do | Wool/cotton | Red. |
| 17 | Cl | Cl | Cl | 1-hydroxynaphthalene-3.8-disulfonic acid | Cotton | Red. |
| 18 | Cl | HO₃S—⟨C₆H₄⟩—NH— | —CH₃ | do | do | Red. |
| 19 | Cl | —NH₂ | —CH₃ | 1-hydroxynaphthalene-3.6-disulfonic acid | do | Red. |
| 20 | Cl | ⟨C₆H₄(SO₃H)⟩—NH— | —CH₃ | 1-hydroxynaphthalene-4.8-disulfonic acid | do | Red. |
| 21 | Cl | ⟨C₆H₄(COOH)⟩—NH— | Cl | 2-aminonaphthalene-6-sulfonic acid | Wool | Orange. |
| 22 | Cl | HOOC—H₂C—HN— | —CH₃ | 1-(2.'5'-dichloro)-phenyl-3-methyl-5-prazolone-4'-sulfonic acid. | do | Yellow. |
| 23 | Cl | H₃C—HN— | Cl | 2-hydroxynaphthalene-3.6-disulfonic acid | Cotton | Red-orange. |
| 24 | Cl | HO—H₄C₂—HN— | —OCH₃ | 2-hydroxynaphthalene-6-sulfonic acid | do | Reddish orange. |
| 25 | Cl | ⟨C₆H₄(SO₂—NH₂)⟩—NH— | —CH₃ | 2-amino-5-hydroxynaphthalene-7-sulfonic acid (coupled in acid medium). | do | Red. |
| 26 | Cl | HO₃S—CH₂—CH₂—NH— | —OC₂H₅ | 1-hydroxynaphthalene-5-sulfonic acid | do | Red. |
| 27 | Cl | ⟨C₆H₄⟩—NH— | Br | 1-hydroxynaphthalene-3.6.8-trisulfonic acid | do | Red. |
| 28 | Cl | H₃C—N—CH₃ | —CH₃ | 2-hydroxynaphthalene-6.8-disulfonic acid | do | Yellowish red. |
| 29 | Br | H₅C₂—N—C₂H₅ | —CH₃ | 2-hydroxynaphthalene-4-sulfonic acid | Wool | Brownish red. |
| 30 | Cl | (HO—C₂H₄)₂—N— | —CH₃ | 2-hydroxynaphthalene-7-sulfonic acid | do | Red. |
| 31 | Cl | —NH—CH₂—CH₂—CH₃ | —CH₃ | 2-hydroxynaphthalene-8-sulfonic acid | do | Red. |
| 32 | Cl | —NH—CH(CH₃)₂ | —CH₃ | 2-hydroxynaphthalene-3.6.8-trisulfonic acid | Cotton | Red. |
| 33 | Cl | —NH—CH₂—CHOH—CH₃ | Cl | 1-hydroxynaphthalene-4.7-disulfonic acid | do | Scarlet. |
| 34 | Cl | —NH—CH₂—CH₂—CH₂—OH | —CH₃ | 1-hydroxynaphthalene-4.7-disulfonic acid | do | Do. |
| 35 | Cl | —NH—CH₂—CH₂—CH₂—O—CH₃ | —CH₃ | do | do | Do. |
| 36 | Cl | —NH—CH₂—CH₂—CH₂—CH₂—OCH₃ | —CH₃ | do | do | Do. |
| 37 | Cl | —NH—CH₂—CH₂—CH(OCH₃)—CH₃ | —CH₃ | do | do | Do. |
| 38 | Cl | —NH—CH₂—CH₂—O—C₂H₅ | —CH₃ | do | do | Do. |

| Ex. No. | a | b | x | A | Dyed on | Shade of the dyeing |
|---|---|---|---|---|---|---|
| 39 | Cl | −N(CH₃)(C₆H₅) | −CH₃ | ......do...... | ......do...... | Do. |
| 40 | Cl | −N(C₂H₅)(C₆H₅) | −CH₃ | ......do...... | ......do...... | Do. |
| 41 [1] | Cl | −NH−⬡−COOH | −CH₃ | 2-aminonaphthalene-3.6-disulfonic acid | Wool | Yellowish red. |
| 42 [1] | Cl | −NH−⬡−COOH | −C₂H₅ | ......do...... | ......do...... | Do. |
| 43 [1] | Cl | −NH−⬡−SO₂−NH₂ | −CH₃ | 2-aminonaphthalene-5.7disulfonic acid | ......do...... | Do. |
| 44 [1] | Cl | −NH−⬡−SO−CH₃ | −Cl | ......do...... | ......do...... | Do |
| 45 [1] | Cl | −NH−⬡−SO₂−CH₃ | Cl | 2-aminonaphthalene-5-sulfonic acid | ......do...... | Do. |
| 46 [1] | Cl | −NH−iso-amyl | −CH₃ | ......do...... | ......do...... | Do. |
| 47 [1] | Cl | −NH−⬡−H | −CH₃ | 2-aminonaphthalene-3.6-disulfonic acid | ......do...... | Do. |
| 48 [1] | Cl | −NH−CH₂−⬡ | −CH₃ | 2-amino-8-hydroxynaphthalene-3.6-disulfonic acid. | ......do...... | Bluish red |
| 49 | Cl | −NH−CH₂−CH₂−CH₂−CH₃ | Cl | 1-amino-8-hydroxy-naphthalene-2.4.-disulfonic acid. | Cotton | Do. |
| 50 | Cl | −N(CH₂−CH₂−OH)(C₆H₅) | Cl | 1-amino-8-hydroxy-naphthalene-4-sulfonic acid. | ......do...... | Do. |
| 51 | Cl | −NH−naphthyl(SO₃H)(SO₃H) | Cl | 1-amino-8-hydroxy-naphthalene-4.6-disulfonic acid. | ......do...... | Do. |
| 52 | Cl | −NH−C₂H₅ | −CH₃ | 1-phenyl-3-methyl-5-pyrazolone-4'-sulfonic acid. | ......do...... | Yellow. |
| 53 | Cl | −NH−⬡−CH₃ | −CH₃ | 1-phenyl-3-methyl-5-pyrazolone-3'-sulfonic acid. | ......do...... | Do. |
| 54 | Cl | −NH−⬡−OCH₃ | −CH₃ | 1-(2'-chloro)-phenyl-3-methyl-5-pyrazolone | Wool | Do. |
| 55 | Cl | −HN−⬡−O−C₂H₅ | Cl | 1-(2.'5'-dichloro)-phenyl-3-methyl-5-pyrazolone-4'-sulfonic acid. | Cotton | Do. |
| 56 | Cl | H₃C−⬡(CH₃)−NH− | −CH₃ | 1-(2'-chloro-6'-methyl)-phenyl-3-methyl-5-pyrazolone-4'-sulfonic acid. | ......do...... | Do. |
| 57 | Cl | H₃C−⬡−CH₃ (NH−) | −CH₃ | 1-phenyl-3-methyl-5-pyrazolone-3'-sulfonic acid amide. | Wool | Do. |
| 58 | Cl | HO₃S−CH₂−CH₂−N(CH₃)− | −CH₃ | ......do...... | ......do...... | Do. |
| 59 | Cl | −NH−CH₂−COOH | Cl | ......do...... | ......do...... | Do. |
| 60 | Cl | −NH−CH(COOH)−CH₂−COOH | Cl | ......do...... | ......do...... | Do. |

| Ex. No. | a | b | x | A | Dyed on | Shade of the dyeing |
|---|---|---|---|---|---|---|
| 61 | Cl | Cl | —CH₃ | 1-(2'-chloro-6'-methyl)-phenyl-3-methyl-5-pyrazolone. | do | Do. |
| 62 | Cl | Cl | —CH₃ | 1-hydroxynaphthalene-4,7-disulfonic acid | Cotton | Scarlet. |
| 63 | Cl | ⬡—NH— (with SO₃H) | —CH₃ | 1-hydroxynaphthalene-4,7-disulfonic acid | do | Do. |
| 64 | Cl | Cl | —CH₃ | 1-(2,'5'-dichloro)-phenyl-3-methyl-5-pyrazolone-4'-sulfonic acid. | do | Yellow.¹ |
| 65 | Cl | ⬡—NH— (with SO₃H) | —CH₃ | 1-(2,'5'-dichloro)-phenyl-3-methyl-5-pyrazolone-4'-sulfonic acid. | do | Do. |
| 66 | Cl | Cl | —CH₃ | 1-hydroxynaphthalene-4,6-disulfonic acid | do | Scarlet. |
| 67 | Cl | ⬡—NH— (with SO₃H) | —CH₃ | 1-hydroxynaphthalene-4,6-disulfonic acid | do | Do. |

¹ Examples 41 to 48 are coupled in acid medium.

Formulae of representative dyestuffs of the foregoing examples are as follows:

*Example 61*

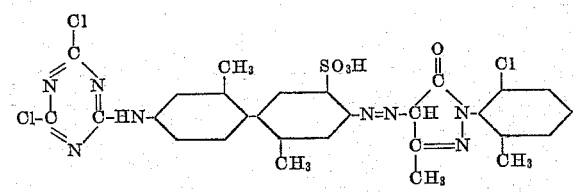

*Example 62*

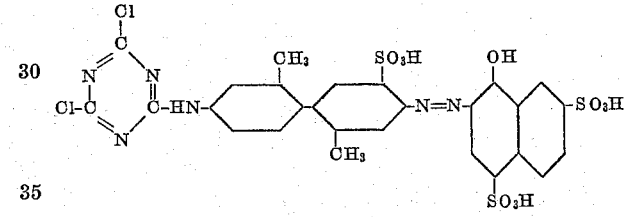

*Example 63*

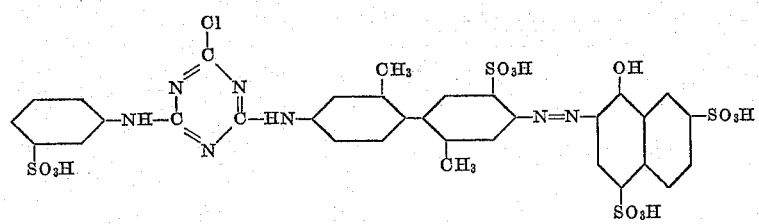

*Example 64*

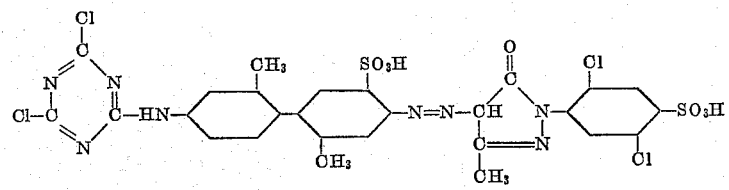

*Example 65*

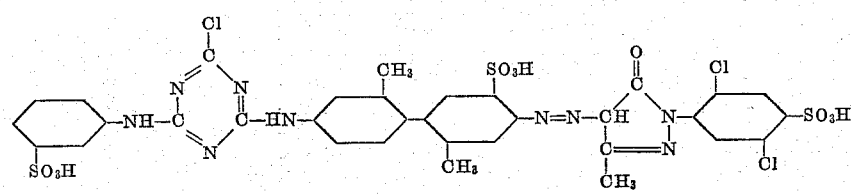

Example 66

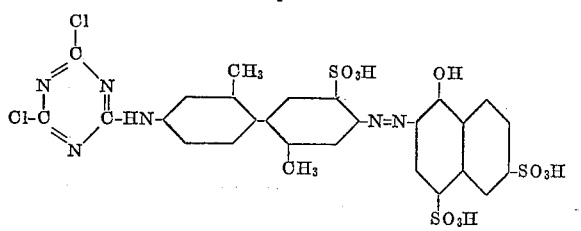

Example 67

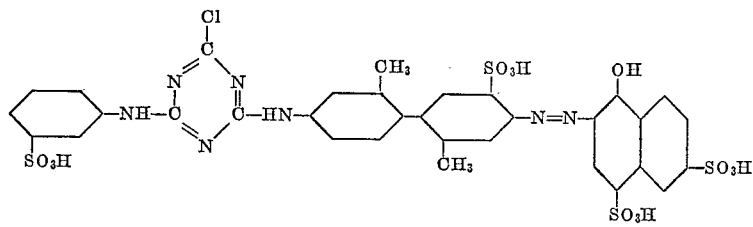

Example 3

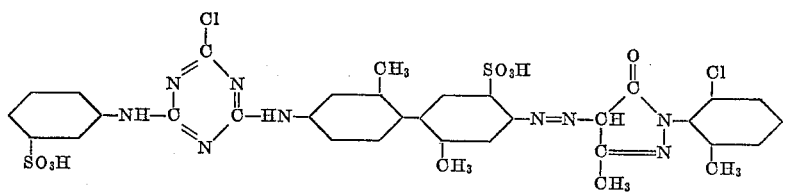

Having thus disclosed the invention what we claim is:
1. A water-soluble monoazo dyestuff of the formula

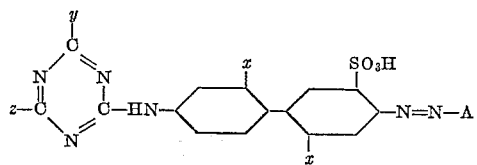

wherein each $x$ represents a member selected from the group consisting of low molecular alkyl, low molecular alkoxy, chlorine and bromine, $y$ represents a member selected from the group consisting of chlorine and bromine, $z$ represents a member selected from the group consisting of chlorine, bromine, amino, lower alkylamino, lower hydroxyalkylamino, lower alkoxyalkylamino, di-(hydroxyethyl)-amino, di-(lower hydroxyalkyl)-amino, carboxymethylamino, dicarboxy-ethylamino, sulfo-ethyl-amino, N-methyl-N-sulfoethyl-amino, phenylamino, methylphenyl - amino, lower alkoxyphenylamino, dimethylphenylamino, trimethylphenylamino, N-lower alkyl-N-phenylamino, N-lower hydroxyalkyl-N-phenylamino, carboxyphenylamino, sulfophenylamino, aminosulfonyl-phenylamino, methylsulfonyl-phenylamino, cyclohexyl-amino, benzylamino and disulfonaphthylamino, and A stands for the radical of a coupling component selected from the group consisting of 1-chlorophenyl-3-methyl-5 - pyrazolone, 1 - (methylchlorophenyl) - 3 - methyl-5-pyrazolone, 1-(aminosulfonyl-phenyl)-3-methyl-5-pyrazolone, 1-dichlorophenyl-3-methyl - 5 - pyrazolone-sulfonic acid, 1-(methyl-chloro-phenyl) - 3 - methyl-5-pyrazolone-sulfonic acid, 1-phenyl-3-methyl-5-pyrazolone-sulfonic acid, 1-hydroxy-naphthalene-mono-, -di- and -trisulfonic acids, 2-hydroxy-naphthalene-mono-, -di- and -trisulfonic acids, 2-amino-naphthalene-mono- and -disulfonic acids, 1-amino - 8 - hydroxy - naphthalene - mono- and -disulfonic acids, 2-amino-8-hydroxy-naphthalene-mono- and -disulfonic acids and 2-amino-5-hydroxy-naphthalene-monosulfonic acid.

2. The water-soluble monoazo dyestuff of the formula

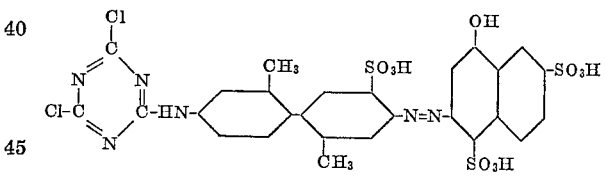

3. The water-soluble monoazo dyestuff of the formula

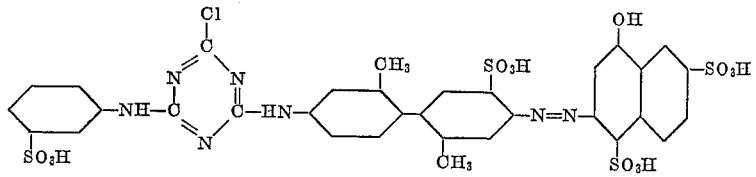

4. The water-soluble monoazo dyestuff of the formula

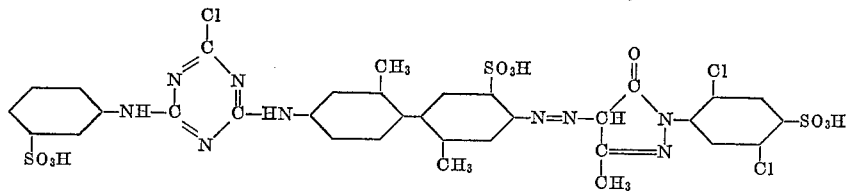

5. The water-soluble monoazo dyestuff of the formula

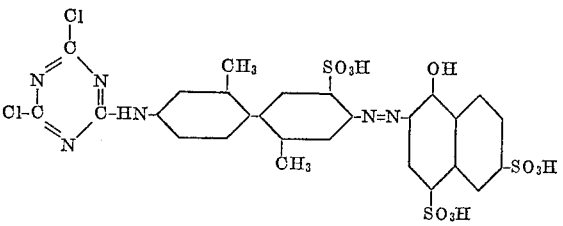

6. The water-soluble monoazo dyestuff of the formula
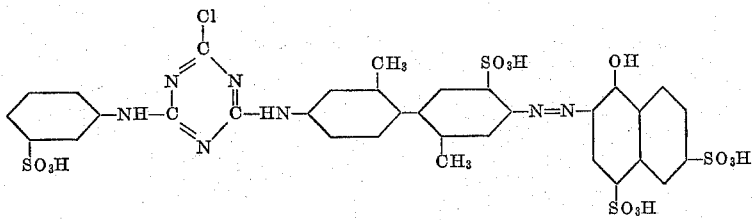
References Cited in the file of this patent
UNITED STATES PATENTS
2,945,021    Fasciati et al. _____ July 12, 1960
FOREIGN PATENTS
200,237    Austria _____ Oct. 25, 1958
200,684    Austria _____ Nov. 25, 1958